United States Patent Office 3,711,303
Patented Jan. 16, 1973

3,711,303
PRODUCTION OF SOY SAUCE
Anthony J. Luksas and Wilmore Williams, Chicago, Ill., assignors to Beatrice Foods Co., Chicago, Ill.
No Drawing. Filed May 11, 1970, Ser. No. 36,427
Int. Cl. A23l 1/22
U.S. Cl. 99—145
28 Claims

ABSTRACT OF THE DISCLOSURE

Soy sauce is produced in a relatively short time by fermenting Maromi with an inoculant selected from Saccharomyces and Debaryomyces or a Maromi isolate.

---

The present invention relates to the production of soy sauce and to soy sauce having the natural flavor and taste of aged soy sauce. The invention further relates to such soy sauce which may be produced in a relatively short time.

Historical records indicate that the Chinese have been using soybean products for well over 3,000 years. A wide variety of foods have been developed by the Chinese based on soybeans as a principal ingredient. Soy sauce, one of the older Chinese products, has become an important condiment in the United States, not only for its use as a flavoring agent alone, but as an ingredient for mixing with other flavoring agents to produce additional sauces and the like, e.g. Worcestershire sauce, which contain from 10 to 30% soy sauce. Soy sauce may be manufactured by two main processes.

Soy sauce may be made by fermentation or enzymatic hydrolysis of protein to give amino acids and low-molecular-weight polypeptides or by the acid hydrolysis process. The former of these two processes, i.e. the fermentation process, is by far the more important process, since it gives the soy sauce a full body and flavor as opposed to the acid hydrolysis process. Hence, most of the soy sauce, especially the higher quality Oriental type soy sauce, manufactured in the United States is made by the fermentation process.

Briefly stated, the fermentation process for preparing soy sauce comprises preparing a mixture of washed, cooked and drained soybeans with parched wheat, or other grains or cereals, and adding to the mixture (without additional water being used) a Koji culture. The Koji culture is a naturally produced culture, and the exact composition of Koji culture is not fully known. However, generally speaking Koji culture contains mold, yeast and lactic acid bacteria. The mixture of soybeans, parched wheat and the Koji culture is allowed to biologically alter for 4 to 10 days and this biologically altered mixture is called Koji. The Koji is added to an aqueous salt solution. The mixture of aqueous salt solution and Koji is called Maromi. The Maromi is then allowed to ferment for an extended time period. While some soy sauce flavor can be developed after fermentation of the Maromi for as little as 30 days, for full-bodied and full-flavored soy sauce, the fermentation is normally allowed to proceed for at least six months and preferably up to a year or more, e.g. 18 months. After the fermentation is complete and the desired degree of body and flavor has been reached, the fermented mass is pressed and the liquid obtained therefrom is soy sauce. The soy sauce may be further mixed with other agents such as salt, coloring, preservatives and the like. As can be noted from the above discussion of the fermentation process for producing soy sauce, the fermentation step requires that the Maromi be allowed to ferment for an extended period of time and that large holding vessels for fermenting the mixture are necessary to produce sizable amounts of soy sauce. As can be also appreciated, it would be desirable to shorten the time of the Maromi fermentation step required to produce a full-bodied and full-flavored soy sauce. Equally important, however, is the requirement that any shortened fermentation time of the Maromi must still result in a full-flavored and full-bodied soy sauce, of the quality expected by the general consuming public.

Therefore it is an object of this invention to provide a process for preparing a full-bodied and full-flavored soy sauce with a shortened Maromi fermentation time. It is a further object of the invention to provide a soy sauce of the fermented type which is full-flavored and full-bodied but which has been produced from Maromi that was fermented in a relatively short period of time. Other objects of this invention will be apparent from the following disclosure and claims.

Basic to the present invention is the discovery that certain organisms will develop the characteristic soy sauce flavor in fermenting Maromi. Having discovered these flavor producing organisms, a process has been devised wherein these organisms are grown during the fermentation of Maromi at a very rapid rate to produce the characteristic soy sauce flavor in a relatively short fermentation time.

In order to completely appreciate the significance of the present invention, reference is made in detail to the conventional process for producing a fermented soy sauce. The conventional process is generally referred to in the art as the "Koji and Maromi" process. The Koji culture is essentially a starter inoculant, the total composition of which is not fully known to the art, as noted above. In a general sense, Koji culture is simply a biologically active portion of a Koji and which may be optionally concentrated and dried. The origin of the first Koji culture is lost in antiquity and in the "Koji and Maromi" process it is necessary to have a Koji culture in order to produce additional soy sauce. Koji culture can be obtained on the open market, and the principal sources of Koji culture are Japan and China, especially Japan. Koji culture may be obtained in a liquid form as well as the dry form, noted above, and may be mixed with prepared soybeans and wheat to produce additional Koji culture or produce Koji from which soy sauce is made by fermentation. In other words, Koji culture is a starter culture of not fully known composition which has been handed down from generation to generation for use in producing soy sauce via the "Koji and Maromi" process.

In the preferred process in the art, an equal mixture of roasted soybeans and boiled soybeans (with excess liquid removed) is mixed with an equal amount of roasted wheat. After thorough mixing of the roasted and boiled soybeans with the roasted wheat, the mixture is placed in a suitable vessel and inoculated with Koji culture. The Koji culture may be concentrated and powdered Koji culture which is commercially available or the Koji culture may be simply a biologically active part of a previously produced Koji. Generally from 1 to 10% by weight of the soybean, wheat, etc. of the Koji culture, which is obtained from a previously produced Koji, is used as the inoculant in the mixture.

When concentrated powdered Koji culture is used as the inoculant, the amount thereof may vary between 1 to 100 parts by weight of powdered Koji culture to 1,000 to 200,000 parts by weight of soybean, wheat, etc. This addition of Koji culture, either in concentrated, powdered form or from a previously produced Koji is well known in the art and is conventional. Hence, any conventional amounts may be used. In either case, the inoculated mixture is fermented for 3 to 10 days, preferably about 5 days, at 60° to 110 °F., especially about 68° to 90° F. Generally speaking the temperature of fermentation will be between 80° and 84° F. During this period the Koji culture produces growth mainly of largely unidentified molds, yeasts and bacteria in the mixture of soybeans and wheat. (This mixture of soybeans, wheat and growing Koji culture organisms is referred to as Koji.) After this initial fermentation period, the mixture of soybeans and wheat with the Koji culture organisms growing therein (now referred to as Koji) is placed in an 18 w./v. percent aqueous salt solution. Generally, from 5 to 40 w./v. percent of the Koji is placed in the salt solution. This mixture of the Koji and salt solution is referred to as Maromi. The Maromi is mixed in a large tank to obtain an even distribution. Thereafter mixing may or may not be performed, depending upon the particular manufacturer making the soy sauce. Mixing of the Maromi is, however, not necessary. The Maromi is then allowed to ferment at 60 to 110° F., especially 68 to 90° F. and ideally 80 to 84° F. for an extended period of time. While this extended period of time may vary widely depending upon the flavor, body and bouquet desired, good quality soy sauce is only produced with fermentations which are allowed to proceed for at least 9 months and the better full-flavored soy sauce is allowed to ferment for as long as 18 months, especially the flavor associated with Oriental style soy sauce. At the end of the fermentation period, the liquid associated with the Maromi is separated from the solids. The solids are discarded and the liquid is further processed, e.g. pasteurized and compounded with another ingredients to produce soy sauce.

Broadly stated, the present process for producing soy sauce comprises fermenting conventional Koji, as described above, in the presence of specific organisms, as hereinafter defined, and in a salt solution with mixing under an inert gas blanket with short periods of aeration, continuing the mixing and fermenting with intermittent aeration for up to 5 weeks and pressing the resulting fermented mixture to obtain a full-flavored, full-bodied, Oriental style soy sauce.

It is greatly preferred that the Koji be comminuted to a relatively small particle size, e.g. by grinding. After grinding, all particles should pass through a number 3 U.S. sieve screen, but much improved results are obtained when all of the particles will pass through at least a number 6 U.S. sieve screen, and especially the average particle size should be less than 1,000 microns, e.g. 1 to 100 microns. Any conventional type grinder or comminuting apparatus may be used for commuting the Koji, for example, an Urschel mill, a gear grinder, a Reitz mill or a stone grinder. However, other grinders such as ball grinders, rod grinders, hammer mills, etc., may be used. It is only necessary that the particle size after grinding be within the range noted above. However, it is most important that during grinding the temperature of the Koji be kept below 145° F., especially below 130° F., e.g. below 100° F., in order to prevent the destruction of the enzymes contained in the Koji. Salt may be added to the Koji either before or after grinding. Conveniently, the salt is added to the Koji prior to grinding so that the salt may be ground to a very small particle size during the grinding process. Alternately, instead of grinding the Koji, the soybeans, wheat, etc., from which the Koji is made may be ground prior to making the Koji, in the same manner as described above. In this case, the above noted temperature requirements are not so critical.

The Koji is then added to water and at this point salt is added, if the salt was not added during the grinding process. The resulting mixture of Koji, salt and water (called Maromi) should contain from 5 to 40 w./v. percent of the Koji, especially between 20 and 25 w./v. percent. The amount of salt in the resulting mixture, added either prior to grinding or after grinding, should be between about 6 to 30 w./v. percent, especially between 15 and 20 w./v. percent and ideally about 18 w./v. percent. While common sodium chloride is the preferred salt, especially in view of the relatively low cost thereof, other salts may be used, e.g. halides, especially the chlorides, of alkaline earth and alkali metals or ammonia. In any event the salt must be an acid salt and particularly suitable are sodium and potassium chloride, calcium chloride and magnesium chloride. Organic salts may also be used, if desired, e.g. sodium acetate and sodium lactate. Nevertheless sodium chloride is the preferred salt and will normally be used in the process.

The mixture of Koji in the aqueous medium (hereafter referred to as Maromi) is then agitated and to the agitated Maromi is introduced an inoculant, as hereinafter further defined.

After inoculation, the Maromi is initially fermented for from 3 to 14 days. Of course longer periods than 14 days may be used but there is no substantial advantage in continuing the fermentation longer than 14 days, and generally no advantage is obtained in continuing the fermentation beyond 7 days. The initial fermentation temperature will be between 60° and 110° F. and especially between 68° and 90° F., e.g. 80° and 84° F. The initial fermentation is carried out in a closed vessel having an inert gas head space. But preferably, at least some intermittent aeration is carried out during the initial fermentation. The inert gas provides essentially anaerobic conditions and the anaerobic conditions may be insured by continuously or intermittently flushing with the inert gas. The intermittent aeration may be carried out by flushing the head space of the vessel with an inert gas, such as nitrogen, containing low levels of oxygen. For the purposes of this specification and inert gas is defined as any gas which is nonreactive toward the Maromi.

Agitation during this initial fermentation period is not essential when no aeration is performed, but agitation is required, at least during part of each aeration step, when aeration is used.

As noted above, during this initial fermentation period, the fermenting Maromi is preferably aerated for short periods of time. This may be accomplished by stirring the fermenting Maromi and sweeping oxygen-containing gases, e.g. air, through the head space of the closed vessel. The amount of oxygen in the head space of the closed vessel during these aerations may be quite low; similarly the dwell period to the oxygen containing gas may be quite short, and can vary from as quickly as the oxygen containing gas can replace the inert gas in the head space and the oxygen containing gas can be subsequently replaced by the inert gas to up to 2 or 3 hours or more. It is not necessary that the oxygen containing gas be allowed to dwell in the head space for any extended period of time and only a momentary displacement of the inert gas in the head space is necessary. However, generally speaking, the oxygen-containing gas will be allowed to dwell in the head space from 1 to 50 minutes, especially from 4 to 15 minutes and preferably about 5 minutes. The frequency of aeration can vary widely and may be from as little as once every four days to as often as once every 10 minutes, especially from once every 2 days to 5 times a day and preferably approximately 2 to 3 times a day. Of course, during this aeration period the fermenting Maromi should be agitated.

The purpose of these intermittent aeration steps is to essentially accomplish in the fermenting Maromi a microaerophillic condition, i.e. a state of oxygen tension that is less than atmospheric and being on the border between aerobic and anaerobic conditions. As can be appreciated from the above, the initial fermentation can be under either anaerobic or microaerophillic conditions, but microaerophillic conditions are greatly preferred. It has been found that microaerophillic conditions, at least for part of the fermentation time, develop a superior full-flavor and full-body soy sauce according to the present invention.

Alternately, instead of intermittent aerations, as discussed above, microaerophillic conditions may be established on a continuous basis by emitting with the inert gas an extremely low level of oxygen into the head space of the closed vessel. The amount of oxygen introduced with the inert gas into the head space of the closed vessel will vary widely depending upon the volume of the head space, the volume of the fermenting mixture, the temperature of fermentation, the state of fermentation, etc. Hence no specific amounts of oxygen can be stated as a general case, but one skilled in the art can readily determine when microaerophillic conditions are produced within the fermenting Maromi and adjust the oxygen content to maintain those microaerophillic conditions. However, when the process is carried out using continuous low levels of oxygen in the gases flushing the head space, it is necessary to continually determine that microaerophillic conditions are being maintained in the fermentation process. This of course requires a considerable amount of effort in following the fermentation process and for this reason it is preferred to intermittently aerate the fermenting Maromi, as noted above, rather than attempting to carry out the fermentation with continuous but low levels of oxygen in the inert gas.

After the initial fermentation period, preferably with aeration as described above, the fermenting Maromi is further fermented for an additional 5 to 30 days or longer, if desired, either in a sealed vessel or with low levels of intermittent or continuous aeration. Hence, the second fermentation may be anaerobic, microaerophillic or mildly aerobic, but microaerophillic or mildly aerobic conditions are greatly preferred, since these conditions produce a superior ultimate flavor. Preferably the Maromi is agitated during the aerations.

It should also be clearly understood that while the best flavor, body and bouquet are developed according to the present process when aeration is carried out in the second fermentation step, an acceptable, but inferior flavor, bouquet and body may also be obtained without any aeration during the subsequent fermentation step and wherein the subsequent fermentation step is carried out under an inert atmosphere. However, since superior flavor, body and bouquet are developed when the fermentation is carried out with the above described aerations in the second fermentation step, this is the preferred embodiment of the invention.

The second fermentation may be carried out at the same temperatures as the initial fermentation and indeed the same procedure for introducing oxygen into the head space may be used. Hence, the second fermentation step may be simply an extension of the first fermentation step, especially where microaerophillic conditions are used in both the first and second fermentations.

After the subsequent second fermentation step, the solids are separated from the liquid by any conventional means, e.g. filtering, pressing, centrifuging, vacuum distillation, etc. The recovered liquid is then mixed with conventional additives such as salts, edible coloring, e.g. caramel, other flavors, preservatives, sweeteners, such as sugars, spices, etc. to produce the finished soy sauce ready for sale to the consuming public. Alternately, the product may be pasteurized either before or after the addition of the additives or before packaging. It is not necessary, however, to pasteurize the soy sauce and indeed some additional flavor will develop after packing the soy sauce when the soy sauce has not been pasteurized.

The inoculant used with the present process is a yeast of the family Endomycetaceae, subfamily Saccharomycetoideae, tribe Saccharomyceteae, and particularly useful yeast of the said tribe are selected from Saccharomyces and Debaryomyces.

For example, species and varieties which may be used include *Saccharomyces cerevisiae, Saccharomyces cerevisiae* var. *ellipsoideus, Saccharomyces pastorianus, Saccharomyces rouxii, Saccharomyces rouxii* var. *polymorphus, Saccharomyces exiguus, Saccharomyces marxianus, Saccharomyces bailii, Saccharomyces logos,* v. Laer et Denamur, *Saccharomyces bayanus, Saccharomyces willianus, Saccharomyces uvarum, Saccharomyces delbrueckii, Saccharomyces delbrueckii,* var. mongolicus, *Saccharomyces carbergensis, Saccharomyces fragilis, Saccharomyces lactis, Saccharomyces rosei, Sacchromyces chevalieri, Saccharomyces bisporus, Saccharomyces pastori, Saccharomyces fermentati, Saccharomyces heterogenicus, Saccharomyces microellipsodes, Saccharomyces oviformis, Saccharomyces mellis, Saccharomyces italicus, Saccharomyces florentinus, Saccharomyces acidifaciens, Saccharomyces steineri, Saccharomyces fructuum, Saccharomyces elegans,* and *Saccharomyces veronae.* All of the species and varieties are known to the art and are easily obtainable.

The particular species of Debaryomyces which may be used include *Debaryomyces hansenii, Debaryomyces kloeckeri, Debaryomyces subglobosus, Debaryomyces vini,* and *Debaryomyces nicotianae.* Likewise the species are known to the art and are readily obtainable.

For a complete discussion of the above-noted yeasts see "The Yeasts," Lodder, J., et al., North-Holland Publishing Company, Amsterdam, 1967, especially pages 117–122 and 270–279, which disclosure is incorporated herein by reference. The foregoing reference gives the "key" to Debaryomyces and Saccharomyces for identification and isolation purposes.

However, in a preferred embodiment of the invention the inoculant is isolated from Maromi since the isolated inoculant gives a better flavor to the soy sauce as opposed to the flavor obtained by using commercially available organisms. The isolated inoculant can be obtained by the following procedure. Prepare two aqueous solutions of YM agar powder (a commercially available material and fully identified hereinafter), one with 18 w./v. percent of NaCl and one with water only (approximately 5 grams of YM agar powder per 100 ml. of aqueous NaCl or water). Sterilize the solutions, e.g. at 250° F. for 15 minutes, and prepare plates by placing 15 to 20 cc. of each solution in separate sterilized petri dishes and cool to 113–120° F. Inoculate each plate with approximately 0.1 to 0.3 cc. of one year old Maromi (produced by the conventional process as noted above) by streaking out with a bacteriological needle, as is the common practice in the art. Incubate the inoculated plates for about four days at 71° F. (some growth will be noted after 48 hours). After incubation, with a bacteriological needle, remove the yeast growths from both the water and saline plates (one skilled in the art can easily identify yeast growths from bacteria and mold growths by visual observation) and place each different yeast growth on a separate YM agar plate prepared or YM agar plate with NaCl, as discussed above. Of course, yeasts taken from YM agar plus salt plates are placed on new YM agar plus salt plates and yeast taken from YM agar plates are placed on new YM agar plates. Serially grow the yeasts on new YM agar plates and YM agar plus salt, respectively, as discussed above, and separate the yeast from each plate and grow on new plates again until essentially pure cultures of yeasts are obtained and the cultures are essentially free from bacteria and mold cultures. Of course, the serial growing of the yeasts is accomplished at the above temperatures and times. The number of serial growings of the yeasts will, of course, depend upon how carefully the yeasts are removed from the plates.

The above procedure is simply that for obtaining pure cultures by serial growths and is quite standard in the art and one skilled in the art will have absolutely no trouble in obtaining pure yeast cultures.

After all of the yeast cultures have been purified, as discussed above, the purified cultures are visually observed under daylight and compared with respect to the following appearances: dull, shiny (glistening) and flaky. The observer will see that some of the yeast cultures are strikingly different from other of the yeast cultures in these three respects, and dull, shiny and flaky cultures will be readily apparent. (With proper streaking of the first Maromi culture, these three appearances will be readily apparent in the first culture of the Maromi and by retaining only the cultures having these three appearances the number of cultures and number of serial growing may be materially reduced.)

The cultures having a dull, shiny or flaky appearance will be those cultures containing the organisms of the present invention. Any one of these cultures may be used to produce soy sauce, but a combination of the three cultures produce an exceptional flavor, body and bouquet.

An alternate procedure for obtaining the "Maromi isolated organisms" may be used. The procedure is as follows. Into distilled water is placed 4 w./v. percent of agar and cooked at boiling to dissolve the agar. The dissolved agar solution is autoclaved and cooled to room temperature, or at least below 45° C. Several plates are made from the agar by mixing the agar with an equal volume of naturally produced soy sauce (produced by the conventional Koji and Maromi process). The soy sauce used in mixing with the agar should be essentially pure soy sauce and suitable purity is obtained by passing the soy sauce through a bacteriological filter. After the mixture of soy sauce in agar solution has solidified in the plates, the plates are inoculated with aged Maromi obtained from a conventional Koji and Maromi process by streaking the plates with a bacteriological needle. The Maromi used for streaking the plates should be at least one month old Maromi but Maromi of twelve months old or longer is desired. The plates are then placed in a conventional anaerobic jar or any other like device to obtain anaerobic conditions. The plates are incubated at mild temperatures, e.g. up to 40° C., especially at room temperature, for 2 to 4 months under anaerobic conditions. After about one month and especially after about two months, distinct colonies of organisms will be observed on the plates. There will be three very distinct and easily recognizable different colonies and essentially no other colonies of any appreciable size will be contained on the plates. These three distinct colonies, by visual observation, will be characterized in that one will be dry, flaky, white, large and rough; the second will be large, creamy (buttery consistency); and the third will be mucoid and having a buttery consistency. If any doubt remains to the observer, although with reasonable care in producing the plates there should be no doubts, the colonies can be further identified by microscopic examination. The first-named colony will have organisms of 6 to 10 microns, the second-named colony will have organisms of 6 to 10 microns, and the third-named colony will have organisms of 2 to 4 microns.

The three distinct colonies noted above, are picked from the plates and placed on separate plates made of YM agar with 18 w./v. percent of NaCl and the colonies are further grown to increase the amount thereof for at least 24 hours at mild temperatures, e.g. room temperature, but the growth may be continued as long as desired. However, little additional growth takes place after two weeks. The procedure of growing the separate colonies on separate YM plates is repeated until a substantial amount of the separate colonies is obtained. While no minimum amount is required, it is more convenient to work at least 1/10 gram of each of the colonies and therefore it is convenient that the growing of colonies on the YM plates be repeated until 1/10 gram of each of the colonies is obtained. This procedure also ensures that the colonies have been purified, which is a standard bacteriological technique.

The separate colonies are picked from the YM agar plates with a bacteriological needle and inoculated into tubes of "yeast medium broth." "Yeast medium broth" is defined according to the standards of Northern Regional Research Lab (NRRL). The yeast medium broth consists of 3 grams of yeast extract, 3 grams of malt extract, 5 grams of beef extract, 10 grams of glucose and 1,000 cc. of water i.e. essentially YM powder without the agar. The broth is prepared by boiling to dissolve and autoclaving to sterilize. One-third of the broth is placed in a flask. To this one-third of broth is added 1 w./v. percent of Tween 80 (Sorbitan mono-oleate) to lower the surface tension thereof. Salt (NaCl) is added to the Tween 80 containing broth and to additional flasks of the broth without Tween 80 to produce an 18 w./v. percent solution of the salt. One flask is inoculated with the first-named organism (the dry, flaky, white, large organisms); one flask is inoculated with the second-named organism (large, creamy, buttery consistency organisms); and one flask is inoculated with the third-named mucoid organism. The first and second-named organisms are inoculated onto flasks which do not contain the Tween 80 and the third-named organism is inoculated onto the flask which does contain Tween 80. All of the flasks are incubated at mild temperatures, e.g. room temperature for at least two weeks. Longer times may be used as desired, but little growth takes place after four months. The growth is then separated from the medium of the flasks in any desired manner, such as centrifuging (where the sediment of the centrifuging is the organisms) and the separated organisms are then combined and are suitable for use in inoculating the Koji in the manner noted above.

For purposes of the present specification and claims, the organisms which are isolated as described above by either technique, are defined by the terms "Maromi isolated organisms" and these terms are meant to describe the above noted isolated organisms. These terms, as used in the claims, are intended to convey this definition. When pure organisms, obtained commercially, are used, as opposed to isolating the organisms, as noted above, it is also preferred that at least one Saccharomyces and at least one Debaryomyces be used in combination to inoculate the Maromi, although only one of the two will produce an acceptable soy sauce. The preferred species are *Saccharomyces rouxii* and *Debaryomyces hansenii*. In any case, at least 10 organisms per cc. of either the commercially available or isolated organisms must be used to inoculate the Maromi, preferably at least 100 organisms per cc., and especially at least 1,000, e.g. 10,000 organisms per cc. of total liquid in preparing the Maromi, as noted above.

While the present invention has been illustrated in terms of producing soy sauce of Koji made from soybeans and wheat, as is apparent to those skilled in the art, Koji may be produced with a combination of soybeans and other grains or cereals. For example, instead of wheat, there may be used other grains or cereals such as rice, barley, sorghum, cotton seed, corn or maize, oats or legumes such as legume seeds. Generally the proportion of soybeans, on a weight basis, to other grains or cereals will be between 25% to 75% soybeans and the remainder being other of the cereals or grains noted above. Preferably, however, the proportion of soybeans to other cereals or grains is approximately 50% by weight. Also, in the preferred process, one-half of the soybeans are roasted and one-half of the soybeans are boiled. The roasted and boiled soybeans are combined with a cereal or grain in approximately equal proportion, e.g. with wheat (roasted). In addition, part of the soybeans may be replaced by other high protein content beans, such as peas, lima beans, black-eyed peas, kidney beans, etc. However, these other beans should not replace more than one-half of the soybeans.

Hence, the term "Koji" as used in the present specification and claims embraces the above noted variation of beans, cereals and grains. The following examples will illustrate the preferred embodiments of the process, but it should be understood that the invention is not limited to the following illustrative examples but is applicable to the extent of the foregoing disclosure.

EXAMPLE 1

A conventional Koji was prepared by boiling in water at 212° F. for 15 minutes 8¾ pounds of soybeans, roasting for 1 hour in a rotating oven at 250° F. 8¾ pounds of soybeans and roasting for 1 hour in a rotating oven at 250° F. 17½ pounds of wheat. The boiled soybeans, roasted soybeans and wheat were mixed until a uniform mixture was obtained. The mixture was ground with Urschel mill until all particles had a size of less than 10 microns. To the resulting ground mixture was then added 0.1 gram of dry powdered Koji culture and allowed to ferment 5 days at 82° F.

EXAMPLE 2

The Koji of Example 1 was placed in 167 pounds of sterilized 18 w./v. percent aqueous NaCl contained in a stainless steel mixing vessel fitted with a paddle stirrer and mixed until a slurry was produced. With mixing, 13 cc. of inoculant in 18 w./v. percent saline solution was added to the slurry. The inoculant contained approximately $1 \times 10^{10}$ organisms of *Saccharomyces rouxii*. The mixing vessel was capped with a head plate having a nitrogen inlet and a nitrogen outlet. Nitrogen was flushed through the head space of approximately 2 cu. ft. at a rate of approximately 10 cc./min. The slurry was maintained at between 80 and 84° F. by means of a water jacket surrounding the mixing vessel. The above conditions were maintained for a total of 5 days, with a 15 minute stirring every 4 hours. After the 5-day period, the nitrogen flush was stopped every 4 hours and replaced by an air flush for 15 minutes, with stirring during the flush and with stirring for 15 minutes after the air flush was completed and nitrogen was again flushed through the head space. After each aeration, the nitrogen flush was resumed and continuously maintained. The above temperature conditions, nitrogen and air flushing schedule was continued for a total of 21 days beyond the initial 5-day fermentation period (e.g., a total of 26 days processing time).

Thereafter, the liquid was separated from the solids by means of a conventional filter press. The liquid had the color and aroma of soy sauce. The taste was that of a good soy sauce with medium body. The soy sauce was aged for two weeks in a stainless steel closed vat and the flavor developed into a very full-bodied good tasting soy sauce.

EXAMPLE 3

The procedure of Example 2 was repeated except that the inoculant contained *Debaryomyces hansenii*. The resulting soy sauce had a slightly better flavor than that of Example 2.

EXAMPLE 4

The procedure of Example 2 was repeated except that the inoculant contained approximately equal amounts of *Saccharomyces rouxii* and *Debaryomyces hansenii*. The resulting flavor was significantly superior to that of either Example 2 or Example 3.

EXAMPLE 5

The procedure of Examples 2, 3 and 4 were repeated except that the air flush used in those examples after the first 5-day period was instead also used during the first 5-day period. In each case a better flavor was obtained.

EXAMPLE 6

This example illustrates the use of organisms isolated from natural Maromi.

Five grams of YM powder* were added to 100 cc. of 18 w./v. percent saline solution and sterilized at 250° F. for 15 seconds and designated "media 1."

Five grams of YM powder were added to 100 cc. of water, sterilized at 250° F. for 15 seconds and designated "media 2."

Media 1 and media 2 were cooled to 115° F. and 20 cc. of each media was placed in separate 3-inch diameter sterilized petri dishes (designated dish 1 and dish 2). Media 1 and 2 were streaked with 1-year-old naturally produced Maromi and allowed to incubate at 71° F. for 4 days.

With bacteriological needles, the yeast cultures (visually identified) which were either flaky, dull or shiny were removed from dishes 1 and 2 and streaked in separate petri dishes containing the same, respective, media as described above. These dishes were incubated at 71° F. for 4 days. This purifying procedure was repeated 3 times, after which pure cultures of flaky, dull and shiny yeast cultures were obtained. The cultures were identified as Saccharomyces and Debaryomyces.

Equal portions of the flaky, dull and shiny cultures were used in the procedure of Example 2, in the same total amounts as in Example 2, instead of the *Saccharomyces rouxii*. The produced soy sauce had an excellent flavor and full body.

EXAMPLES 7–11

The procedure of Example 2 was repeated except that the conditions and materials, as shown in Table I, were used. The results are noted in the table.

EXAMPLE 12

The procedure of Example 2 was repeated except that no aeration was performed during the process. The resulting flavor was inferior to the flavor of Example 2, but was still the characteristic soy sauce flavor.

As can be seen from the foregoing disclosure, soy sauce can be produced with very short total fermentation times, e.g. in less than 2 months and especially in about 30 days. This, of course, results in a significant saving in time and money over the conventional periods of 1 year to 18 months.

TABLE I

| Example | Koji | Inoculant | First fermental temp. and time | Second fermentation temp. and time | Flavor |
| --- | --- | --- | --- | --- | --- |
| 7 | 2 lbs. roasted soybeans<br>3 lbs. boiled soybeans<br>30 lbs. roasted wheat | $1 \times 10^5$ *Saccharomyces rouxii* | 70° F., 7 days | 80° F., 14 days | Good flavor—medium body. |
| 8 | Same as above | $1 \times 10^3$ *Saccharomyces rouxii* | do | do | Mild flavor—light body. |
| 9 | do | $1 \times 10^{12}$ *Saccharomyces rouxii* | 83° F., 5 days | 83° F., 21 days | Very distinct flavor and full body. |
| 10 | 20 lbs. boiled soybeans<br>5 lbs. roasted soybeans<br>12 lbs. roasted wheat | $1 \times 10^{10}$ *Saccharomyces rouxii* | 84° F., 7 days | 84° F., 25 days | Strong flavor—full body. |
| 11 | Same as above | do | 105° F., 7 days | 105° F., 21 days | Strong flavor, but slightly acid taste—full body. |

We claim:

1. In a Koji and Maromi process for the production of soy sauce, the improvement comprising inoculating the Maromi with an inoculant having as the sole essential organisms of said inoculant at least one yeast selected from the group consisting essentially of Saccharomyces, Debaryomyces, Maromi isolated yeasts and mixtures thereof, said inoculated Maromi having at least 10 yeast

---

*YM powder is YM agar (dehydrated) as disclosed in Wickerham, Tech. Bull. No. 1029, U.S.D.A. 1951 and contains yeast extract, beef extract, dextrose and agar. This is a standard commercially available material.

organisms per cc. of liquid initially fermenting said inoculated Maromi in a closed vessel having an inert gas head space for at least about 3 days at a temperature between about 60° and 110° F. under anaerobic or microaerophillic conditions and subsequently further fermenting for at least 5 days at a temperature between 60° and 110° F. under anaerobic, microaerophillic or mildly aerobic conditions and separating the liquid of the fermented Maromi from the solids, and wherein the total fermentation time is no more than about 5 weeks.

2. The process of claim 1 wherein the said Maromi is produced from a Koji which was ground to a particle size which will pass through a No. 3 U.S. sieve screen.

3. The process of claim 2 wherein the particles will pass through a No. 6 U.S. sieve screen.

4. The process of claim 3 wherein the said Koji was ground at a temperature below 145° F. and has an average particle size of less than 1,000 microns.

5. The process of claim 4 wherein the said temperature is below 130° F.

6. The process of claim 1 wherein the said Maromi contains an edible salt solution and the amount of salt in said solution is from 5–30 w./v. percent.

7. The process of claim 6 wherein the said salt is NaCl.

8. The process of claim 6 wherein the said solution contains from 15–20 w./v. percent of NaCl.

9. The process of claim 8 wherein the said solution contains approximately 18 w./v. percent of NaCl.

10. The process of claim 1 wherein Maromi is produced from Koji containing a grain or cereal.

11. The process of claim 10 wherein the grain or cereal is wheat.

12. The process of claim 11 wherein the said Koji contains from 25–75% by weight of soybeans and from 75–25% by weight of wheat.

13. The process of claim 1 wherein the Maromi contains at least 1,000 yeast organisms per cc. of liquid.

14. The process of claim 1 wherein the yeast are selected from *Saccharomyces rouxii* and *Debaryomyces hansenii*.

15. The process of claim 1 wherein the said yeast are Maromi isolated yeasts.

16. The process of claim 1 wherein at least intermittent aeration is carried out during said initial fermentation.

17. The process of claim 16 wherein the Maromi is agitated during said at least intermittent aeration.

18. The process of claim 16 wherein microaerophillic conditions are established for at least part of the said initial fermentation.

19. The process of claim 1 wherein at least intermittent aeration is carried out during the said subsequent fermentation.

20. The process of claim 19 wherein the said aeration of the said subsequent fermentation is carried out with agitation.

21. The process of claim 19 wherein microaerophillic conditions are established for at least part of said subsequent fermentation.

22. The process of claim 19 wherein the aeration is intermittent, and the time period of aeration is less than 2 hours and the aeration is carried out at least once a day.

23. The process of claim 1 wherein the total fermentation time is 30 days or less.

24. The process of claim 1 wherein the said yeast are Saccharomyces.

25. The process of claim 1 wherein the said yeast are Debaryomyces.

26. The process of claim 18 wherein microaerophillic conditions are maintained throughout said initial fermentation.

27. The process of claim 21 wherein microaerophillic conditions are maintained throughout said subsequent fermentation.

28. The process of claim 1 wherein the initial fermentation is up to 14 days and the subsequent fermentation is up to 30 days.

References Cited

UNITED STATES PATENTS

| | | | |
|---|---|---|---|
| 3,495,991 | 2/1970 | Mogi et al. | 99—145 |
| 1,394,236 | 10/1921 | Togano | 99—145 |

FOREIGN PATENTS

| | | | |
|---|---|---|---|
| 3,542 | 6/1962 | Japan | 99—145 |
| 139,609 | 3/1948 | Australia | 99—145 |

OTHER REFERENCES

Hesseltine: Industrial Mycology, "Shoyu" Mycologia, vol. 57, 1965, pp. 174–177.

Lodder et al.: "The Yeasts," North-Holland Pub. Co., Amsterdam, Interscience, N.Y., 1952, pp. 142–145.

A. LOUIS MONOCELL, Primary Examiner

J. M. HUNTER, Assistant Examiner